United States Patent
Takayasu et al.

(10) Patent No.: US 8,437,819 B2
(45) Date of Patent: May 7, 2013

(54) SUPERCONDUCTOR CABLE

(75) Inventors: Makoto Takayasu, Lexington, MA (US); Joseph V. Minervini, Cambridge, MA (US); Leslie Bromberg, Sharon, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 883 days.

(21) Appl. No.: 12/488,174

(22) Filed: Jun. 19, 2009

(65) Prior Publication Data

US 2010/0099570 A1    Apr. 22, 2010

Related U.S. Application Data

(60) Provisional application No. 61/103,618, filed on Oct. 8, 2008, provisional application No. 61/112,405, filed on Nov. 7, 2008.

(51) Int. Cl.
  *H01B 12/02* (2006.01)
  *H01B 12/08* (2006.01)
  *H01B 12/16* (2006.01)
  *H01L 39/02* (2006.01)

(52) U.S. Cl.
  USPC ........... 505/230; 505/231; 505/163; 505/490; 505/704; 505/884; 174/125.1; 174/15.4; 29/599

(58) Field of Classification Search ................. 505/163, 505/230, 231, 430, 431, 704; 174/125.1, 174/15.4, 15.5; 29/599; 335/216; 62/51.1
See application file for complete search history.

(56) References Cited

U.S. PATENT DOCUMENTS

| | | | |
|---|---|---|---|
| 2,249,509 A | | 7/1941 | Welch, Jr. et al. |
| 3,428,926 A | * | 2/1969 | Bogner et al. ............... 335/216 |
| 4,161,062 A | * | 7/1979 | Agatsuma et al. ............. 29/599 |
| 4,329,539 A | * | 5/1982 | Tanaka et al. ............. 174/125.1 |
| 4,377,905 A | * | 3/1983 | Agatsuma et al. ............. 29/599 |
| 5,331,800 A | | 7/1994 | Schaumburg et al. |
| 5,514,877 A | | 5/1996 | Nakamura et al. |
| 5,929,385 A | | 7/1999 | Sugimoto et al. |
| 6,360,425 B1 | * | 3/2002 | Christopherson et al. ...... 29/599 |
| 6,562,761 B1 | | 5/2003 | Fritzemeier et al. |
| 6,671,953 B2 | | 1/2004 | McAninch et al. |
| 2003/0029629 A1 | | 2/2003 | Spreafico et al. |
| 2003/0183410 A1 | * | 10/2003 | Sinha et al. ................. 174/68.1 |
| 2004/0082482 A1 | | 4/2004 | Rey |
| 2006/0073975 A1 | | 4/2006 | Thieme et al. |
| 2006/0238928 A1 | | 10/2006 | Wakuma et al. |
| 2006/0293189 A1 | | 12/2006 | Ries |
| 2008/0180202 A1 | * | 7/2008 | Otto et al. .................... 335/284 |

OTHER PUBLICATIONS

PCT International Search Report, Application No. PCT/US09/047961, Feb. 17, 2010.

(Continued)

*Primary Examiner* — Stanley Silverman
*Assistant Examiner* — Kallambella Vijayakumar
(74) *Attorney, Agent, or Firm* — Sam Pasternack; MIT Technology Licensing Office

(57) ABSTRACT

Superconductor cable having a plurality of flat, tape-shaped ribbon superconductor wires assembled to form a stack having a rectangular cross section, the stack having a twist about a longitudinal axis of the stack. Multiple superconductor cables including twisted stacked-cables of the flat-tape-shaped superconductor wires, and power cable comprising the twisted flat-tape stacked cables are disclosed. Superconducting power cable disposed within and separated from an electrical insulator with a space passing cryo-coolant between the superconducting cable and insulator is also disclosed.

57 Claims, 13 Drawing Sheets

OTHER PUBLICATIONS

PCT Written Opinion, Application No. PCT/US09/047961, Feb. 17, 2010.
PCT Notice of Transmittal of International Search Report, Application No. PCT/US09/047961, Feb. 17, 2010.
Yamaguchi, S. et al., Research Activities of DC Superconducting Power Transmission line in Chubu University, Journal of Physics, Conference Series, 97, (2008).
Long, N. J. et al., Narrow Strand YBCO Roebel Cable for Lowered AC Loss, Journal of Physics, Conference Series, 97, (2008).
Ito, S. et al., Performance Analysis of Butt Jointing in Remountable HTc Superconducting Magnet, Inter. J. of Applied Electromagnetics and Mechanics, 19, pp. 467-472, (2004).
Weber, C.S. et al., Testing and Demonstration Results of the 350m Long HTS Cable System Installed in Albany, NY, Applied Superconductivity, 17, pp. 2037-2042, (2007).
Maguire, J. F. et al., Development and Demonstration of a HTS Power Cable to Operate in the Long Island Power Authority . , Applied Superconductivity, 17, pp. 2034-2037 (2007).
Hirose, Masayuki et al., High-Temperature Superconductivity (HTS) DC Cable, SEI Technical Review, 61, pp. 29-35, (2006).
Goldacker, W. et al., ROEBEL Assembled Coated Conductors (RACC): Preparation, Properties and Progress, Applied Superconductor, 17, pp. 1-4, (2007).
Kalsi, S. et al., General Cable Superconductors Ltd, Superconducting Transformers using Continuously Transposed Cable, WEB, (2009).
Furuse, M. et al., Feasibility Study of Low-Voltage DC Superconducting Distribution System, Applied Superconductivity, 15, pp. 1759-1762, (2009).
Hasegawa, T. et al., 12 kA HTS Rutherford Cable, Applied Superconductivity, 14, pp. 1066-1069, (2004).
Chowdhuri, Pritinda et al., Feasibility of Electric Power Transmission by DC Superconducting Cables, Transactions on Applied Superconductivity, 15, pp. 3917-3926, (2005).
Diego, Politano et al., Technical and Economical Assessment of HTS Cables, Transactions on Applied Superconductivity, 11, pp. 2477-2480, (2001).

\* cited by examiner

SUPERCONDUCTOR CABLE

This application claims priority to U.S. provisional application Ser. No. 61/103,618 filed Oct. 8, 2008 and to U.S. provisional application Ser. No. 61/112,405 filed Nov. 7, 2008, the contents of both of which are incorporated herein by reference in their entirety.

BACKGROUND OF THE INVENTION

This invention relates to superconductor cables and more particularly to a superconductor cable made from a torsionally twisted multi-layer tape conductor stack.

A significant amount of worldwide effort has been devoted over the last decade to development of High Temperature Superconductor (HTS) wires of BSCCO-2223, BSCCO-2212 and YBCO for various electronic device applications such as transformers, fault current limiters, energy storage, magnets and power transmission cables. These practical applications demand high current capacities of the HTS superconductors without accompanying AC losses or magnetic flux coupling losses.

Current capacity of superconducting conductors can be increased with a parallel arrangement of the wires. However, flux couplings created in the loop circuits among the superconducting wires generate significant heat of resistive and magnetic hysteresis losses in the superconducting wires. The magnetic flux coupling between superconducting wires has been easily reduced by a transposition technique of twisting wires about each other if the wires are circular types such as NbTi and $Nb_3Sn$ superconductors. However, the twisting transposition technology has not been used for HTS superconducting tapes of thin flat shapes (typically 0.1 mm thick and 4 mm wide).

On the other hand, a round wire of BSCCO-2212 HTS superconductor has been developed, and high current cables using a conventional Rutherford type cabling method have been manufactured. [T. Hasegawa, J. Nishioka, N. Ohtani, Y. Hikichi, R. Scanlan, R. Gupta, N. Hirano, and S. Nagata, "12 kA HTS Rutherford cable," IEEE Transactions on Applied Superconductivity, vol. 14, No. 2, pp. 1066-1069, 2004.]

Another successful development of a high current cable for flat tape HTS superconductors is the Continuously Transposed Cable (CTC) technology. This cabling method for a flat HTS tape has been developed based on a roebl cabling. The cabling concept of the roebling is seen, for example, in U.S. Pat. No. 2,249,509 of Welch, et al., and also recent U.S. Pat. No. 5,331,800 of W. Schaumburg, H. Gottschling, "Apparatus for making a cable by roebling rectangular cross-sectioned strands". The CTC technology has been developed by General Cable Superconductors Ltd. [R. A. Badcock, N. J. Long, M. Mulholland, S. Hellmann, A. Wright, and K. A. Hamilton, "Progress in the Manufacture of Long Length HTS Roebel Cables," in proceedings of ASC 2008, and N J Long, R Badcock, P Beck, M Mulholland, N Ross, M Staines, H Sun, J Hamilton, R G Buckley, "Narrow strand YBCO Roebel cable for lowered AC loss," Journal of Physics: Conference Series 97 (2008) 012280].

The CTC method requires cutting a flat HTS tape in a specially designed zigzag pattern instead of bending used for the roebling, and assembling the flat tapes to form a transposed cable. The CTC technology has a difficulty developing a large conductor due to the fabrication method of the roebling. So far the CTC cable current of 2 kA using 17 tapes of 5 mm width has been fabricated.

The applications of high current HTS superconductors is growing in the area of electric transmission of AC and DC power. [D. Politano, M. Sjostrom, G. Schnyder and J. Rhyner, "Technical and economical assessment of HTS cables," IEEE Transactions on Applied Superconductivity, vol. 11, No. 1, pp. 2477-2480, 2001. P. Chowdhuri, C. Pallem, J. A. Demko and M. J. Gouge, "Feasibility of electric power transmission by DC superconducting cables," IEEE Transactions on Applied Superconductivity, vol. 15, No. 4, pp. 3917-3926, 2005. M. Hirose, T. Masuda, K. Sato and R. Hata, "High-temperature superconducting (HTS) DC cable," SEI Technical review, 61, January 2006. J. F. Maguire, F. Schmidt, S. Bratt, T. E. Welsh, J. Yuan, A. Allais and F. Hamber, "Development and demonstration of a HTS Power cable to operate in the Long Island power authority transmission grid," IEEE Transactions on Applied Superconductivity, vol. 17, No. 2, pp. 2034-2037, 2007. C. S. Weber, R. Lee, S. Ringo, T. Masuda, H. Yumura and J. Moscovic, "Testing and demonstration results of the 350 m long HTS cable system installed in Albany," IEEE Transactions on Applied Superconductivity, vol. 17, No. 2, pp. 2038-2042, 2007.] Recently, some resources have been applied to DC power cable development, primarily in Japan. [S. Yamaguch, M. Hamabe, I. Yamamoto, T. Famakinwa, A. Sasaki, A. Iiyashi, J. Schltz and J. Minervini, "Research activities of DC superconducting power transmission lone in Chubu University," $8^{th}$ European Conference on Applied Superconductivity (EUCAS 2007) Journal of Physics: Conference Series 97, 2008, 012290] Some research groups have begun to analyze the design of high current cables using second-generation high temperature superconductor (HTS) tapes for transmission and distribution applications. It has been recognized that DC power distribution may play an important role in smaller scale power systems by either increasing system efficiency, increasing system reliability and robustness, or adding system flexibility, or some combination of all of these advantages. For example, a near-term commercial application of HTS cables for DC power distribution might be feasible for data server centers. Electric power consumption in modern data server centers often exceeds 10 MW per installation and is on a continuous growth path, representing a few percent of today's electricity consumption in the United States. Although most data centers are powered with AC systems, it is projected that DC systems can be more effective by reducing distribution losses and by being less expensive to install and operate. Several potential new applications for HTS DC cables could be for power distribution in microgrids and for transmission of electric power to the grid from alternative energy sources such as wind farms, solar farms, geothermal sites, fuel cells, etc.

It is therefore an object of the present invention to provide a high temperature superconductor cable that can be used in both AC and DC applications with particular applicability to DC applications requiring voltage over a wide range depending on application for example from relatively low voltage in the 400-600 V range for power distribution systems and up to 100 kV for transmission applications. It is also envisaged that HTS DC cables will carry significantly higher current than HTS AC cables with currents in the 10,000-25,000 A range, but not limited to these values. A further object is a power distribution cable that minimizes the cryogenic losses both in the leads and in a cryostat by using compact cable cross-sections.

Yet a further object of the invention is the development of superconductor cables for eventual implementation in large-scale DC power transmission systems as well as high current conductors for various electromagnetic equipment.

SUMMARY OF THE INVENTION

According to a first aspect, the invention is a superconductor cable having a plurality of flat, tape-shaped ribbon superconductor wires assembled to form a stack having a rectangular cross section. The stack has a torsional twist about a longitudinal axis of the stack. This structure is referred to herein as a "basic cable." In a preferred embodiment, the wires are YBCO, BSCCO, or MgB$_2$ tape conductors. It is also preferred that the stack have a substantially square cross-section. It is preferred that the twist be within the range of strain tolerances of the superconductor material, and also to minimize strain in the conductor due to bending radius of the cable. In one embodiment the superconductor wires in the twisted stack are bonded together partially or entirely. The bonding may be with electrically conducting material such as solder or with non-electrically conducting material.

An alternative embodiment would not bond the tapes in order to minimize stresses due to bending of the stack.

It is preferred that the stack be enclosed within either an electrically conducting sheath made of, for example, copper, aluminum, titanium, titanium alloys, Inconel and Incoloy, or enclosed by a non-electrically conducting material such as Teflon PTFE (Polytetrafluoroethylene) and fiberglass-epoxy resin composite.

In yet another embodiment, coolant may flow within the conducting or non-conducting sheath, to cool the superconductor. The coolant would thus be in direct contact with the superconducting cable.

In yet another aspect the invention is a superconductor cable including a plurality of the basic cables described above that are themselves twisted together. It is preferred that the number of basic cables be 3, 9, or 12, as in conventional cables, but any number of basic cables is contemplated. The superconductor wires in the basic cable maybe spliced from shorter pieces.

In yet another aspect, the invention is a superconductor cable including a plurality of flat, tape-shaped ribbon superconductor wires radiating outwardly from a longitudinal axis and twisted about the longitudinal axis. The plurality of superconductor wires may be encased in a sheath that is either electrically conducting or non-conducting. Cooling may flow within the sheath, directly providing cooling to the superconductor.

In still another aspect, the invention is a superconductor cable having a tube including a plurality of spiral grooves along its length on the surface of the tube with at least one tape-shaped superconductor disposed in each of the grooves. It is preferred that a stack of tape-shaped superconductors be disposed in each groove. In one embodiment of this aspect of the invention, the tube is split along a spiral groove. The tube may be made of an electrically conductive material. In yet another embodiment of this aspect of the invention, a twisted stack of superconductors may be disposed within the tube. A sheath may be provided to surround the twisted stack within the tube. Insulation may be disposed between the sheath and the tube. In yet another embodiment of this aspect of the invention, spacers may be disposed between the sheath and the tube to provide a coolant channel.

In yet another aspect, the invention is a superconducting cable structure including a superconducting cable disposed within, and spaced apart from, an insulator creating a coolant channel therebetween. A cryostat surrounds, and is spaced apart from, the insulator to create a return coolant channel or a vacuum space for thermal insulation. In this aspect of the invention, the wall thickness of the insulator is selected based on the applied voltage. The insulator may include metallic portions. It is preferred that the insulator has a smooth surface which reduces the friction of flowing liquid nitrogen.

In another embodiment of this aspect of the invention, a second superconducting cable is disposed within, and spaced apart from, a second insulator, the second superconducting cable/insulator combination disposed within the cryostat. The cryostat is tubular with a substantially circular cross section. For a more compact cable, the cryostat is tubular having a substantially elliptical cross section. The superconducting cable/insulator combinations may be twisted together. A normal conductor may also be disposed within the cryostat. The cryostat may also include a coolant return channel disposed therein.

DESCRIPTION OF THE PREFERRED EMBODIMENT

Figure 1A:
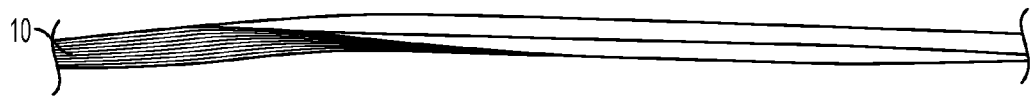
FIG. 1(a) is a perspective view of a stack of high temperature superconductor multi-layer wires.
Figure 1B:
FIG. 1(b) is a perspective view of a twisted multi-layer tape conductor.

With reference first to FIG. 1(a), a multi-layer stack 10 includes a plurality of flat, tape-shaped ribbon superconducting wires that may be made from, for example, YBCO, BSCCO, or $MgB_2$. Suitable high temperature superconducting tapes are available from American Superconductor Corporation of Westboro, Mass. and from SuperPower, Inc. of Schenectady, N.Y. as well as from other companies. After the tapes are stacked to form the stack 10, they are torsionally twisted about the longitudinal axis without an external tensile or compressive longitudinal-force, as shown in FIG. 1(b). The amount of twist is limited to the range of strain tolerances of the tape superconductors. An advantage of the innovative cable is that it makes possible that the twisting can be performed before the final wire heat treatment process to eliminate strain degradation of wire performance due to twisting such as for BSCCO tapes. The twisted multi-layered tapes may be bonded with electrical material (soldering or co-extrusion) to increase stability and fault current or quench protection, to increase mechanical strength of the superconductor and to obtain better thermal cooling or non-electrical material that will limit coupling losses and increase mechanical strength. However, there are advantages not to solder/bind the wires together, such as more resilience to bending of the cable, and in absorbing differential thermal contractions between the tapes, the conductor and the cryostat. If not a monolith, the structure would be "rope like" being able to absorb better differential contraction, at the expense of mechanical strength, which would have to be provided by other means. It is possible to control the transconductance between tapes, from fully insulating (by placing an insulator on the surface of each tape), to partially conducting, by applying either a resistive coating or perforating a dielectric at intervals along the tapes.

The twisted structure may be enclosed by electrically conducting metals such as copper or aluminum serving as a stabilizer and supporting structure. The enclosure need not have to necessarily seal the conductor completely. Spot-welding could be used, for example. The enclosing material can also be made of other materials such as titanium, its alloys, or Inconel, or Incoloy having similar thermal contraction characteristics as the superconducting tape materials. The bonding or soldering materials can fill fully or partially the covering enclosure. The central core of the basic stack may be completed filled by solid material or made with a void to carry a coolant. An enclosing sheath may have a round outside diameter with a square hole along its axis to receive a basic cable. In this case, the cable can be twisted after the stacked wires have been inserted into the sheath.

It should be noted that the present invention allows the use of short pieces of HTS tapes (called sectioned tapes) for a long cable since the current carried by a sectioned tape can be shared through neighbor tapes among the stacked tapes, useful when there is a break or a splice in one of the tapes. In this case, tapes need to be electrically bonded together to make longer tape fabrications economically. At least partial electrical contact between tape by a butt joint or an overlapping joint within a stack allows for low-loss current redistribution around spliced tapes, or portions of a single tape which has poor superconducting properties, thus increasing overall production yield. It should be noted that even without the overlap or the butt the current would redistribute to the rest of the tapes across the sections of the sectioned tape. The current will redistribute back to the sectioned tape due to finite voltage developed in the cable due to the presence of a different sectioned tape.

The tapes need not be symmetric, and in particular, YBCO tapes are not symmetric. The superconducting layers are surrounded on one side by a thin low-resistivity layer, and on the other side by a thicker, high resistivity layer (the usually highly resistive substrate, presently made from a high-nickel alloy). In the case of the electrically bonded tapes, it would be useful to solder the tapes such that each tape is facing another tape such that the low resistivity layers face each other. Current transfer between these tapes occurs with reduced voltage and power dissipation.

Figure 2:
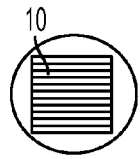
FIG. 2 is a cross-sectional view of an elemental multi-layer conductor, basic cable, according to the invention.

FIG. 2 shows a cross section of an enclosed basic twisted multilayer conductor. If, for example, 2G HTS wire recently developed is used, 40 tapes may be stacked. The 2G tape will carry roughly 80 amps per 4 mm wide tape at the self-field at 77 K in liquid nitrogen, and 125 A at 12 T and 112 A at 15 T at 4.2 K in liquid helium. Therefore, the basic conductor 10 illustrated in FIG. 2 having 40 tapes will carry approximately 3 kA at 77 K with self-field and 4.5 kA at the field of 15 T at 4.2 K. The conductor diameter is approximately 7 mm. The average current density for the embodiment in FIG. 2 will be about 78 $A/mm^2$ at 77 K without field and 116 $A/mm^2$ at 15 T at 4.2 K.

Figure 3:
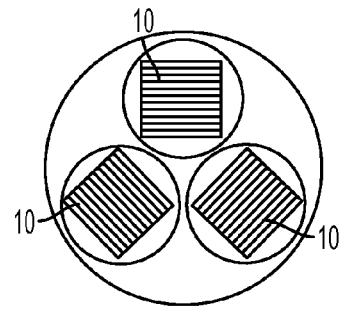
FIG. 3 is a cross-sectional view of a 3-conductor cable.

Using the basic twisted multi-layer conductor shown in FIG. 1(b), larger cabled conductors can be fabricated. For example, as shown in FIG. 3, three of the basic cables may be twisted together. The 3-conductor cable shown in FIG. 3 can carry approximately 9 kA at self-field at 77 K and 13 kA at 15 T field at 4.2 K. The diameter of the 3-conductor cable in FIG. 3 is approximately 15 millimeters.

Twisting of the basic cable shown in FIG. 1(b) and the twisting together of multiple cables as shown, for example, in FIG. 3 is important in order to reduce magnetic flux coupling between superconducting wires. The flux coupling creates undesired internal loop currents and magnetic flux jumps, which result in heat generation by resistive losses and magnetic hysteresis losses in the superconducting wires.

Figure 4A:
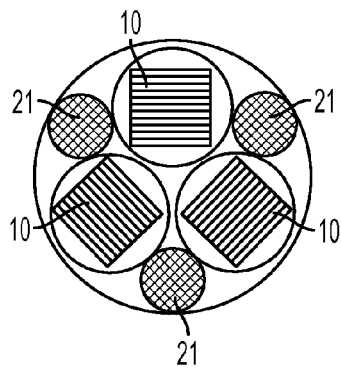
FIG. 4(a) is a cross-sectional view of a 3-conductor cable having electric stabilizers in the spaces between the conductors.
Figure 4B:
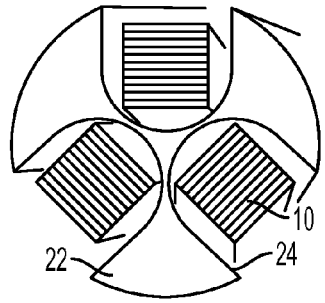
FIG. 4(b) is a cross-sectional view of a 3-conductor cable embedded in an open structure support having twisted grooves.
Figure 4C:
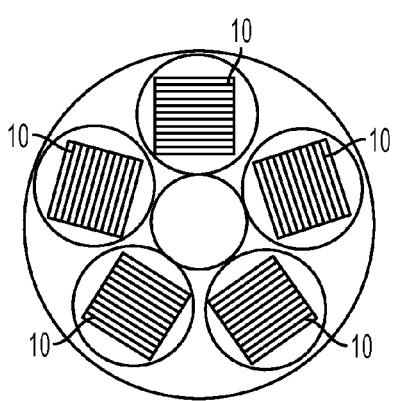
FIG. 4(c) is a cross-sectional view of 5-conductor cables allocated around a longitudinal axis and twisted about the longitudinal axis.

With reference now to FIG. 4(a), the three basic conductor cables 10 include electric stabilizers 21 made of electrically-conducting material in the spaces between the conductors. As shown in FIG. 4(b), the conductor may be fabricated by embedding the stacked/twisted multi-layer tape conductors 10 directly into a structural material 22 having multiple twisted grooves 24. It should be noted that in order to reduce degradation of the critical current due to magnetic fields, the orientation of the applied field and self-field should be kept as parallel as possible to the superconductor tape plane. Therefore it is desired to arrange the tape planes perpendicular to the radial direction during twisting the cables shown in FIGS. 3 and 4 along the cable axis. An advantage of the conductor shown in FIG. 4(b) is easily controlled tape planes during embedding of the tapes in the twisted grooves. FIG. 4(c) shows a superconductor cable comprising five basic conductor cables 10 allocated around a longitudinal axis and twisted about the longitudinal axis, where the tapes comprising each basic conductor are twisted keeping their surface planes oriented perpendicular to the radial direction of the longitudinal cable axis.

Figure 5:
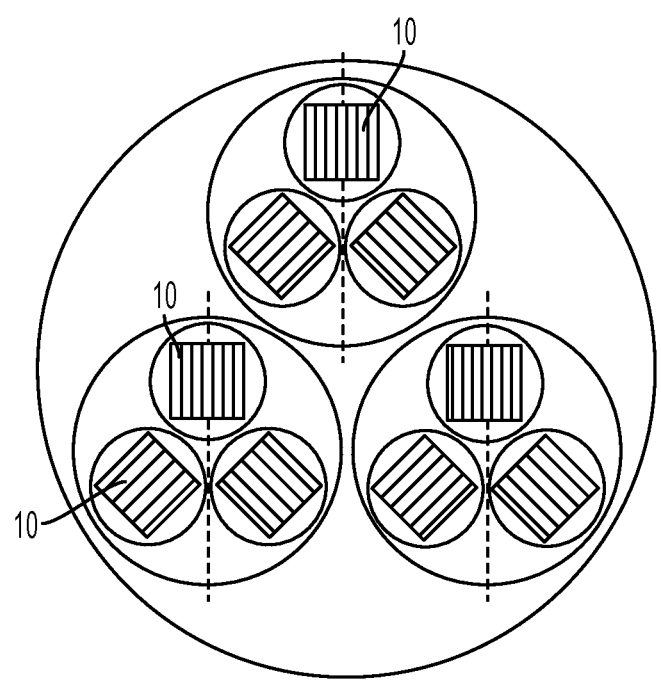
FIG. 5 is a cross-sectional view of a 9-conductor cable (three triplets).
Figure 6:
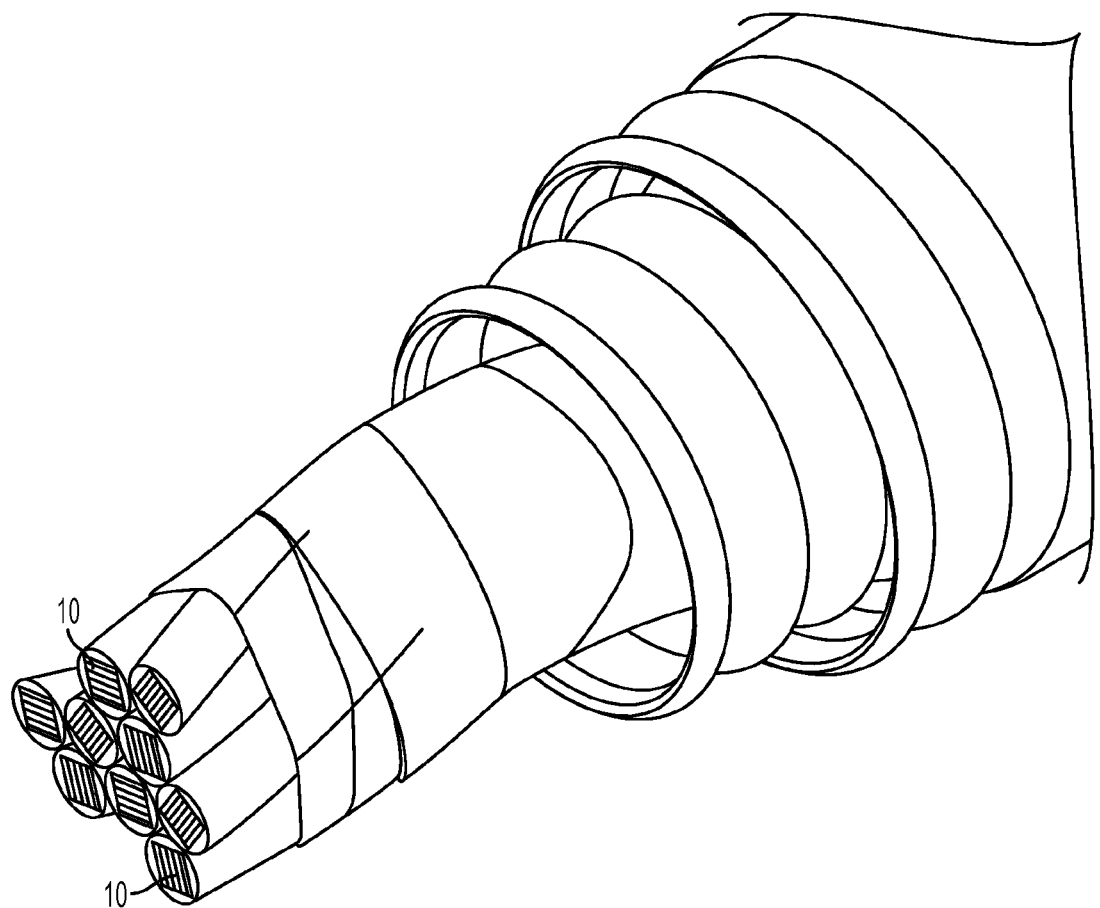
FIG. 6 is a perspective view of the 9-conductor cable shown in FIG. 5.

With reference now to FIG. 5, the structure shown is a 9-conductor cable formed by three of the 3-conductor cables shown in FIG. 3. The conductor shown in FIG. 5 will have a diameter of about 35 mm with a capacity of about 25 kA at 77 K and 40 kA at 15 T field at 4.2 K. FIG. 6 is a perspective view of a 9-conductor 3×3 cable with a cryostat for a power cable application.

Figure 7:
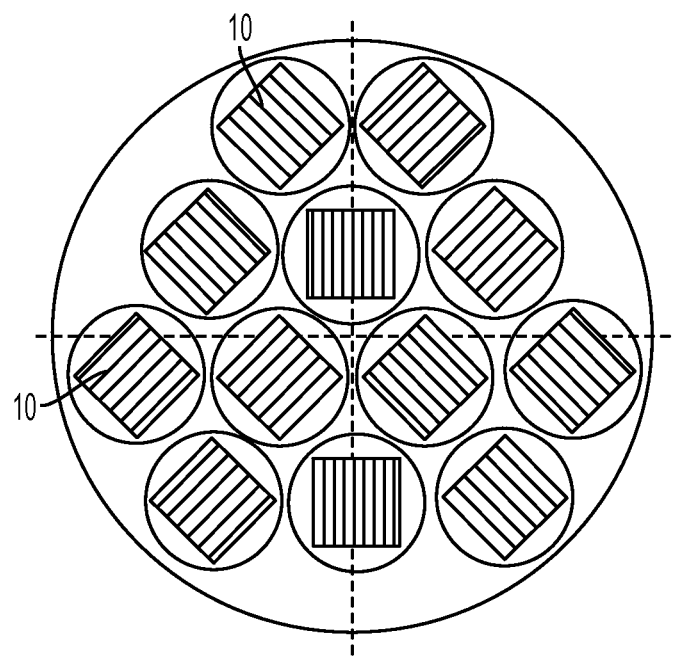
FIG. 7 is a cross-sectional view of a 12-conductor cable.
Figure 8A:
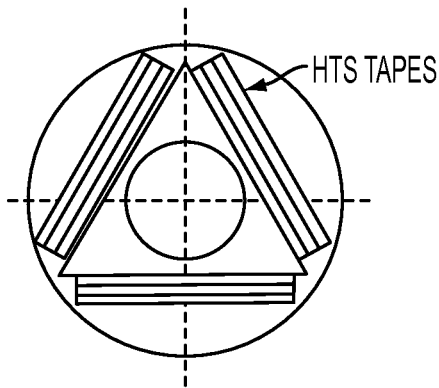
FIGS. 8(a-f) are cross-sectional views of various alternate basic cables of the invention.
Figure 8B:
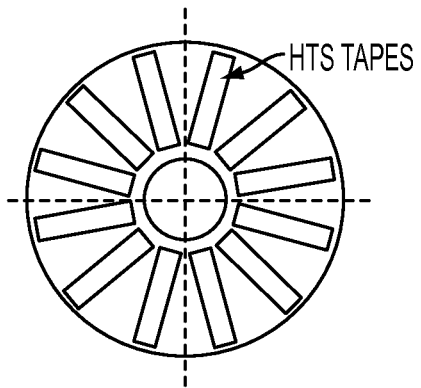
Figure 8C:
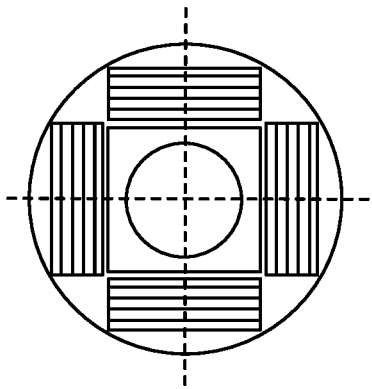
Figure 8D:
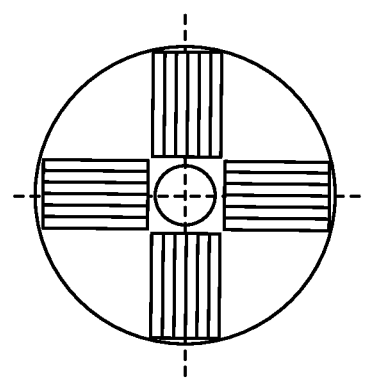
Figure 8E:
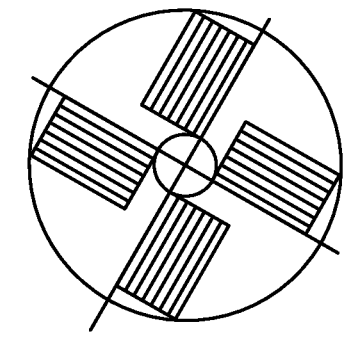
Figure 8F:
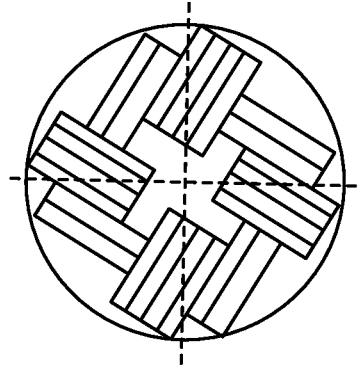

FIG. 7 shows a 12-basic-conductor cable formed directly from the basic conductors discussed above. In this case, the cable diameter is approximately 30 millimeters. The characteristics of the conductors discussed above are summarized in Table 1.

TABLE 1

Estimated current and current density of various conductors.

| Conductor Cables | Current at self field at 77 K | Current at 15 T at 4.2 K | Current density at self field at 77 K | Current density at 15 T at 4.2 K |
|---|---|---|---|---|
| Basic conductor (FIG. 2) | 3 kA | 4.5 kA | 78 A/mm$^2$ | 116 A/mm$^2$ |
| 3 conductors (FIG. 3) | 9 kA | 13 kA | 51 A/mm$^2$ | 74 A/mm$^2$ |
| 9 conductor 3 × 3 (FIG. 5) | 25 kA | 40 kA | 26 A/mm$^2$ | 41 A/mm$^2$ |
| 12 conductor (FIG. 7) | 32 kA | 54 kA | 45 A/mm$^2$ | 77 A/mm$^2$ |

FIG. 8 illustrates cross-sectional views of various alternate basic cables composed of stacked tapes corresponding to the cable shown in FIG. 2. The sub-stacks can follow a helical path along the axial direction, providing means of establishing a mild twist on the cable. It should be noted that in FIGS. 8a and 8c the tape planes are mostly parallel to the direction of the self-field. As mentioned earlier, this aspect is important in applications for distribution/transmission, where the magnetic fields are due to self-fields. The cases of FIGS. 8a and 8c illustrate a solution that assembles superconducting tapes placed perpendicularly to the radial direction, decreasing the effect of the self field on current carrying capabilities of the tapes.

Figure 9:
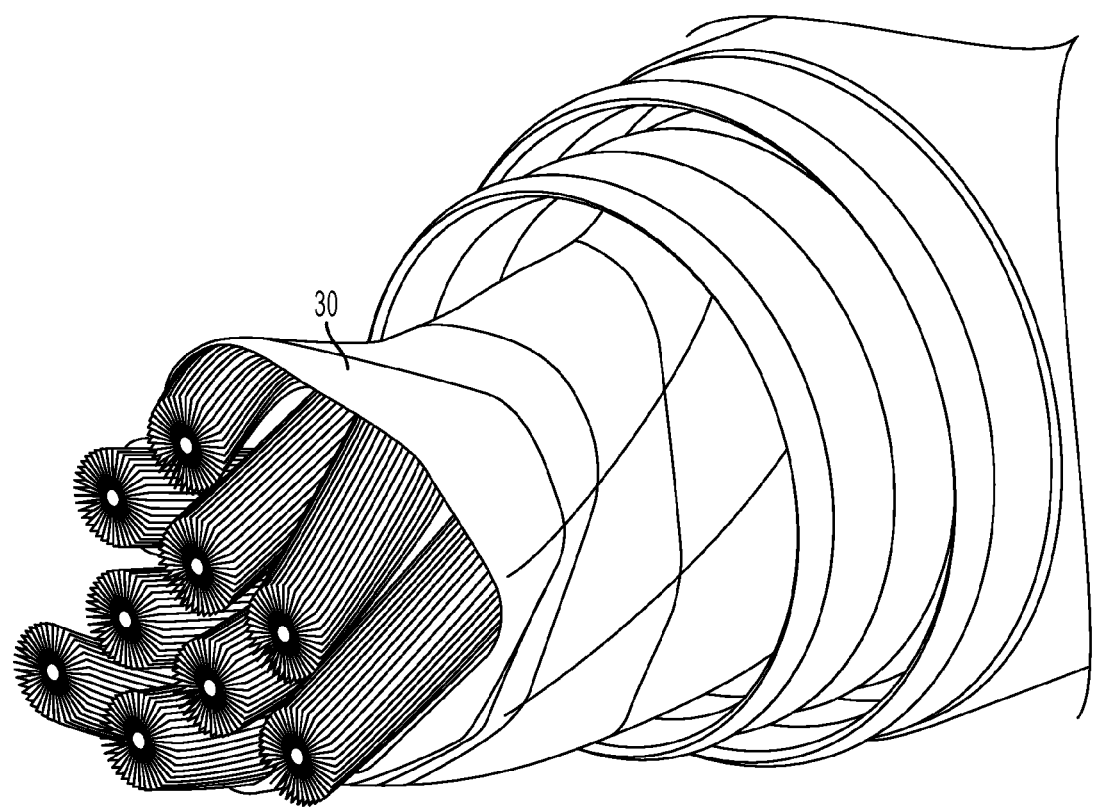
FIG. 9 is a perspective view of a 9-conductor cable according to another embodiment of the invention shown in FIG. 8(b).

Yet another embodiment of the invention is illustrated in FIG. 9. In this embodiment, instead of stacking the flat tapes, the tapes radiate outwardly from a longitudinal axis and twisted about the longitudinal axis. The cable in FIG. 9 includes nine of the twisted basic cables having this configuration. As shown in FIG. 9, the plurality of cables are encased in the sheath 30 that may be conducting or non-conducting.

Figure 10A:
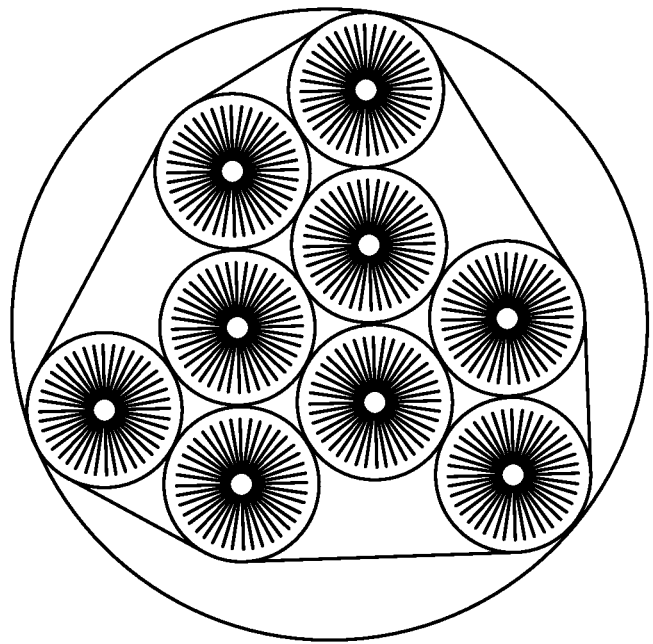
FIGS. 10(a) and 10(b) are cross-sectional views of two different 9-conductor cables.
Figure 10B:
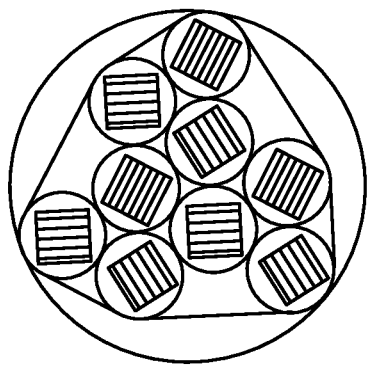

FIGS. 10(a) and 10(b) illustrate the packing efficiencies of two embodiments of the invention. Note that the packing density in FIG. 10(b) that employs a stack of conductors is higher than the packing density that can be achieved using the embodiment having the radially disposed conductors.

An advantage of the innovative cable is that is possible to make joints between sections of cables by using a butt joint concept where two opposing cables are joined together. Means of making these joints are taught by Ito et al [Ito, S., Hashizume, H., Yamauchi, T., *Performance analysis of butt jointing in remountable HTC superconducting magnet, International Journal of Applied Electromagnetics and Mechanics*, v 19, n 1-4, 2004, p 467-472]. Stacks of HTS tapes can be joined together, providing good properties with minimal resistive dissipation at the joints. When there are multiple cables, it would be possible to utilize this type of joint for the different basic cables that make the complex cable. The joints can be made by tapering the superconducting ends of each basic cable, or without a taper. It may be useful to apply a soft or pliable material in between the cables, or to place highly conducting nanoparticles in between, such as gold, silver nanoparticles, or carbon nanotubes. It is not meant that this in the only type of joint/splice of the invention, just one possible embodiment.

Figure 11:
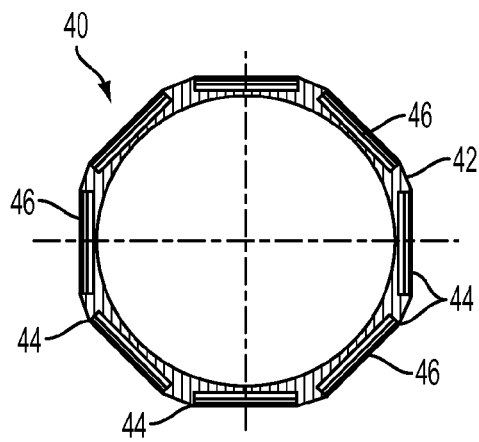
FIG. 11 is a cross-sectional view of another embodiment of the invention disclosed herein.
Figure 12:
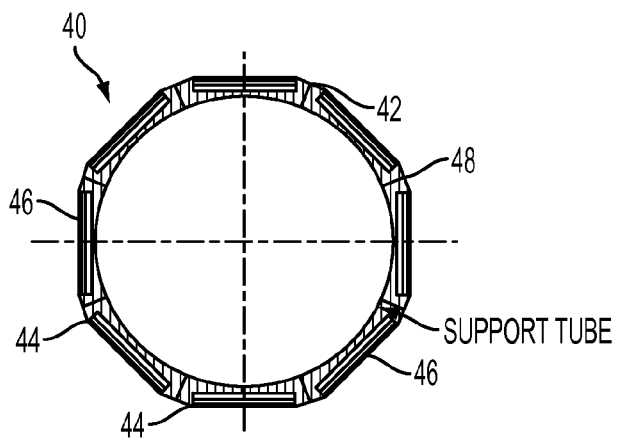
FIG. 12 is a cross-sectional view of the embodiment shown in FIG. 11 and including a split tape mounting tube.
Figure 13:
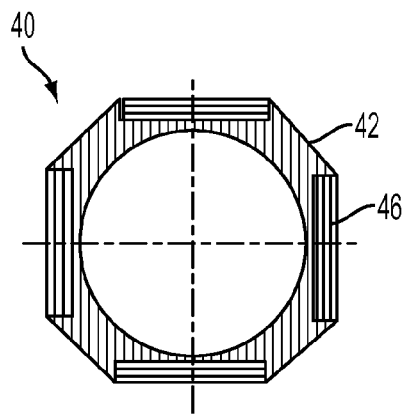
FIG. 13 is a cross-sectional view of yet another embodiment of the invention disclosed herein.

With reference now to FIG. 11, an alternate basic conductor 40 includes a tape mounting holder 42 that is tubular. The holder or tube 42 has multiple spiral slots 44 on its surface. Each slot 44 is formed as a spiral groove along the length of the tube 42 so that superconducting tapes 46 (one tape or multiple tapes) are securely wrapped on the surface in the groove 44. The mounting holder 42 serves as a stabilizer of the superconducting cable in the event that the superconductors 46 become resistive. The tape mounting holder 42 can be split and bonded with thin higher electric resistive material as shown at 48 in FIG. 12 along the spiral groove. By splitting the tube, the stiffness and flexibility of the tape mounting holder can be optimized and also undesired electric loop currents in the mounting holder tube can be eliminated. FIGS. 11 and 12 show an 8-slot conductor, while FIG. 13 shows a 4-slot conductor. The number of slots will be varied depending on conductor size as will be appreciated by those of skill in the art.

Multiple superconductor tapes can be stacked as described earlier and mounted in the grooves. The tapes may be insulated in order to reduce AC loss. If AC loss is not a concern, the tapes may be soldered on the mounting holder 42 of electrically conductive material such as copper. Soldering material is selected to optimize mechanical and electrical characteristics.

Figure 14:
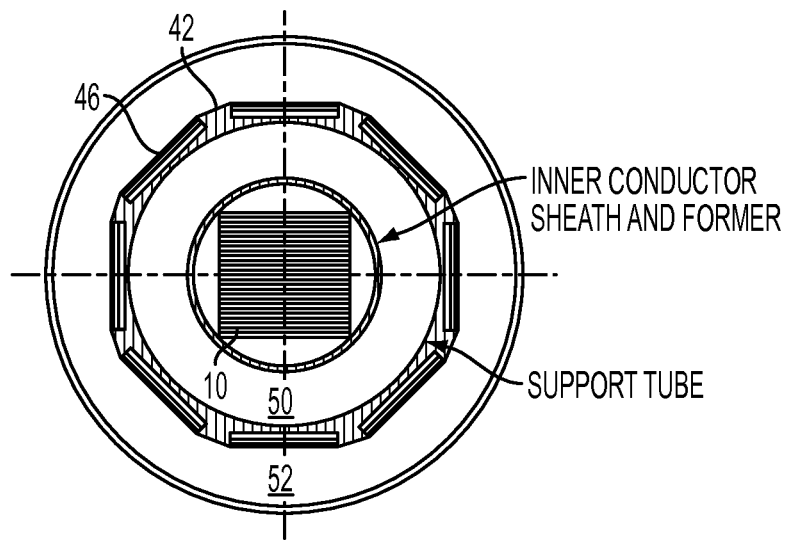
FIG. 14 is a cross-sectional view of an embodiment of the invention disclosed herein including outer and inner superconductors.
Figure 15:
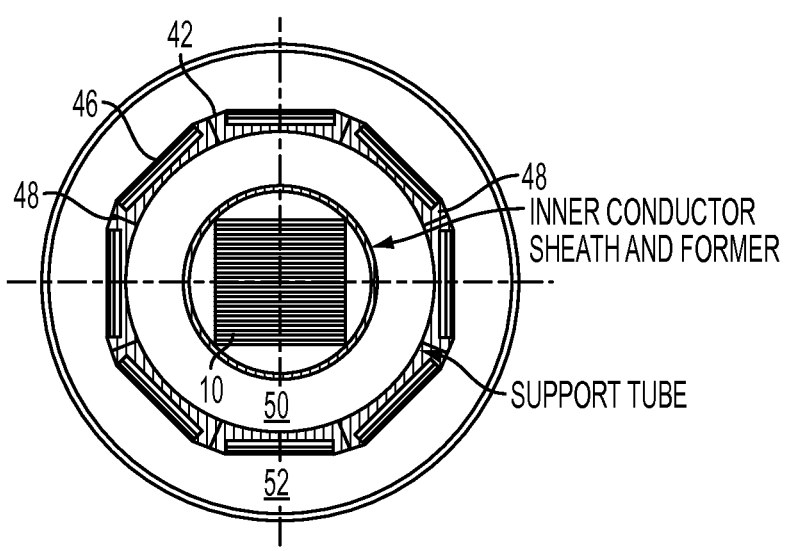
FIG. 15 is a cross-sectional view of the embodiment shown in FIG. 14 but including a split tape-mounting holder.

FIG. 14 is directed to a transmission power cable having two circuits using the conductor described above in conjunction with FIG. 11 for one circuit. At the center in this embodiment, the inner circuit is provided with the basic conductor 10 or multiple basic conductors as shown in FIGS. 2-5. The basic inner conductor 10 is twisted as discussed earlier. In the case that the inner region is composed of multiple basic conductors, as shown in FIG. 5, the individual basic cables are twisted and the assembly of multiple basic cables is also twisted. In this case, the inner circuit conductor can also be used as a former for the cable so that it is not necessary to provide an additional space for a former. This arrangement allows the making of a compact cable and reduces heat leakage. FIG. 15 is similar to FIG. 14 but the outer conductor has slits 48 as discussed above in conjunction with FIG. 12. The two circuits of the transmission cable shown in FIGS. 14 and 15 are separated with proper insulation layers 50 and 52 such as polypropylene-laminated paper (PPLP), and can be immersed in a cryo-coolant, such as liquid nitrogen.

Figure 16:
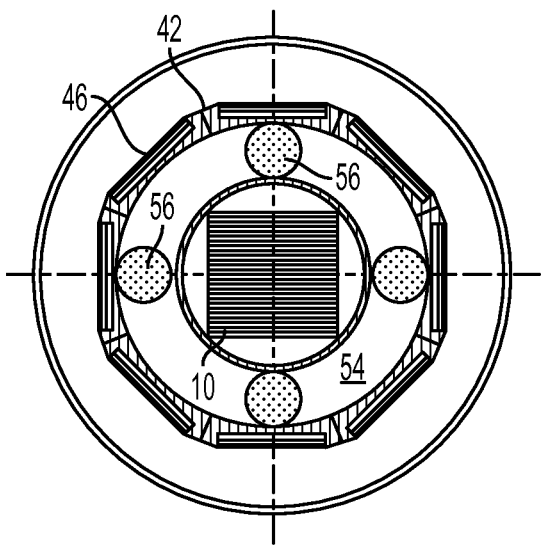
FIG. 16 is a cross-sectional view of an embodiment of the invention that includes spacers.

An alternate cable design is shown in FIG. 16. In this case the conductors are separated by a coolant path 54. Spacers 56 in this region maintain a gap to provide proper electrical insulation between the inner and outer conductors.

Figure 17:
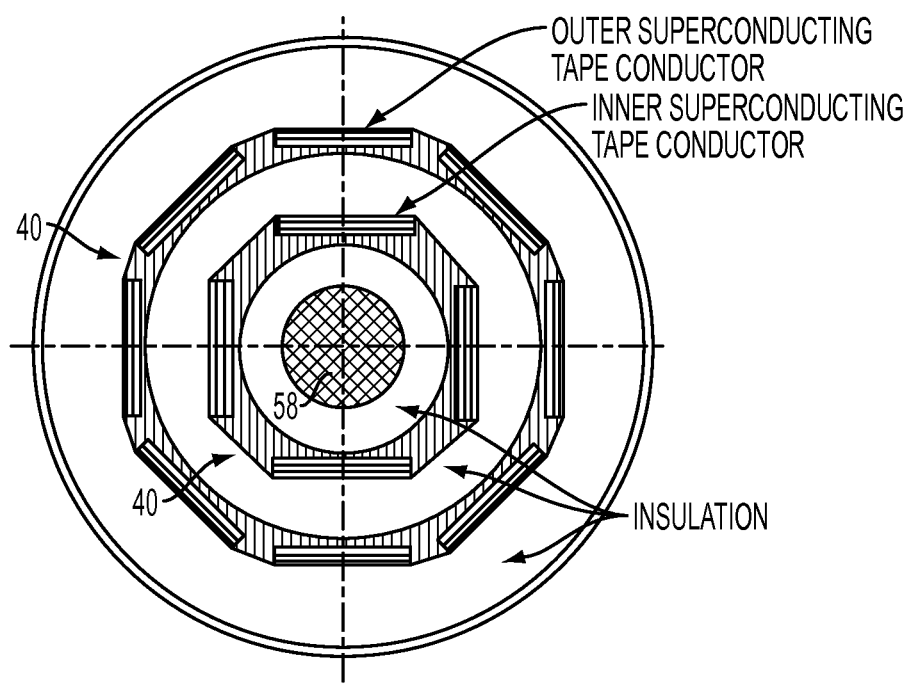
FIG. 17 is a cross-sectional view of yet another embodiment of the invention.

FIG. 17 illustrates a power cable having two circuits using the conductors illustrated above in FIGS. 11 and 13. The conductors are mounted along a center former 58.

Figure 18:
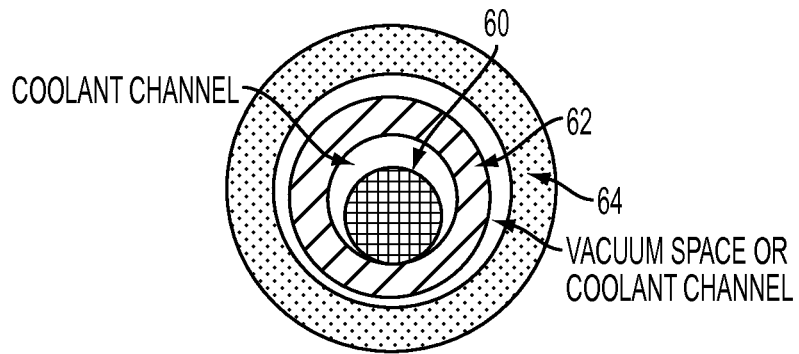
FIG. 18 is a cross-sectional view of an embodiment of the invention in which a superconducting conductor is disposed within, and spaced apart from, an electrical insulator.

Yet another embodiment of the invention is shown in FIG. 18. In this embodiment, a superconducting conductor 60 such as conductors shown in FIGS. 2 to 5 is disposed within, and separated from, an electrical insulator 62. The electrical insulator 62 is itself disposed within, and spaced from, a cryostat 64. The space between the superconducting cable 60 and insulator 62 creates a channel for passing cryo-coolant, such as liquid nitrogen. This configuration is especially useful since the superconducting cable 60 is made independently from the insulation layer 62. Therefore, the superconducting cable 60 can be installed separately after installing the cryostat 64 and the electric insulator 62. The configuration in FIG. 18 also makes it possible to replace only the superconducting cable 60 for repair. The space between the outer surface of the insulator 62 and the inner surface of the cryostat 64 may be used for a return coolant channel or a vacuum space for thermal insulation.

Figure 19:
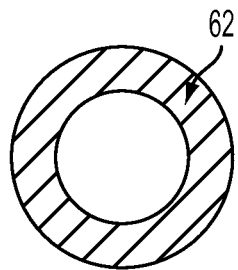
FIG. 19 is a cross-sectional view of an electric insulator suitable for use in the embodiment of FIG. 18.
Figure 20:
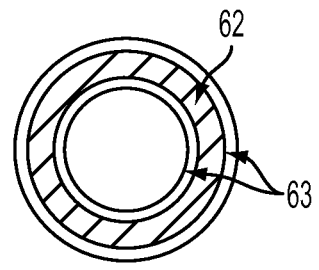
FIG. 20 is a cross-sectional view of an insulator suitable for use in the embodiment of FIG. 18 and includes metallic portions.

The electrical insulator 62 shown in FIG. 18 is shown in more detail in FIGS. 19 and 20. The electrical insulator 62 is generally a cylindrical form with a wrapping tape-type insulator or a solid material. The inner diameter is larger than the cable diameter thereby allowing space for passing coolant therethrough. The wall thickness of the insulator 62 is selected to be sufficient for a selected applied electrical voltage. FIG. 20 shows the insulator 62 in which the surface has been covered with other insulation material or metallic material such as tubes 63 to improve mechanical and electrical characteristics, such as obtaining better friction properties between the contact surfaces (such as for the cable and insulator as well as liquid cryo-coolant flow) and uniform electric field distribution in the insulator. Low mechanical friction is important for cable installation into the insulation tube 62 and also for thermal contraction during the cooling down of the superconducting cable. It is also important to provide a smooth surface for coolant flow to reduce a pressure drop in the coolant channel. The surface of the tube 62 in FIG. 20 is also useful for isolating the cable-cooling channel from other areas in the cryostat by a metallic surface tubing to provide a vacuum tight wall. Since electrical insulation is usually a good thermal insulator, the electric insulation layer 62 is also useful for thermal insulation in this cryostat design.

Figure 21:
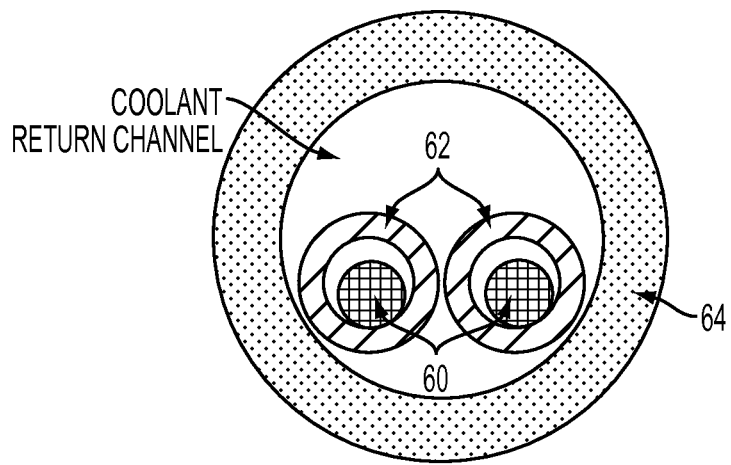
FIG. 21 is a cross-sectional view of another embodiment of the invention using a circular cross section cryostat.
Figure 22:
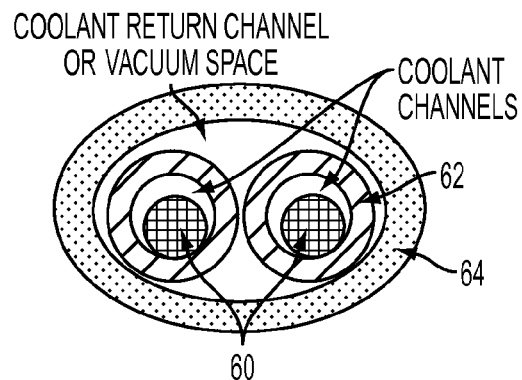
FIG. 22 is an embodiment of the invention utilizing a cryostat having a substantially elliptical cross section.

FIG. 21 shows a pair of superconducting cable 60/electric insulator 62 combinations within a cryostat 64. In this circular cryostat configuration, the cables can be twisted about each other to reduce AC losses. The space between the cable insulators 62 and the cryostat 64 is used for a coolant channel or a vacuum insulation as discussed above. The coolant channels of the cables can be used for coolant feed only or they can form a loop of coolant with one serving as the feed and the other for a return. As shown in FIG. 22, the cryostat 64 may have an elliptical cross section to make a compact and efficient cryostat in situations where the cables do not need to be twisted around each other. In the parallel circuit arrangements for a superconducting power cable shown in FIGS. 21 and 22, fabrication of terminals with a cryostat on a superconducting power cable as well as joints between cables becomes much simpler than that for the conventional concentric cable configurations. It is especially beneficial for short power cable applications.

Figure 23:
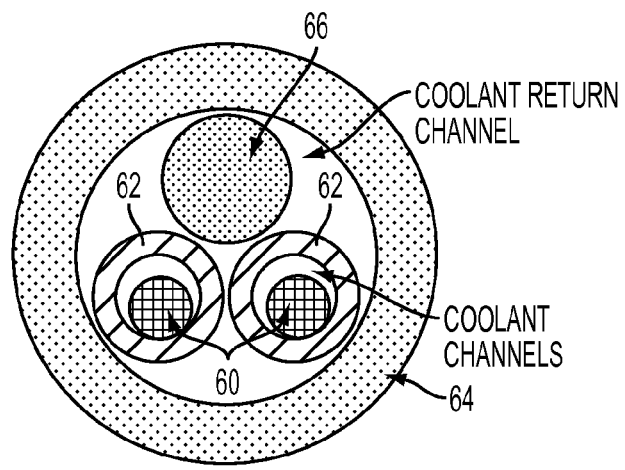
FIG. 23 is a cross-sectional view of an embodiment of the invention including a normal conductor within the cryostat.
Figure 24:
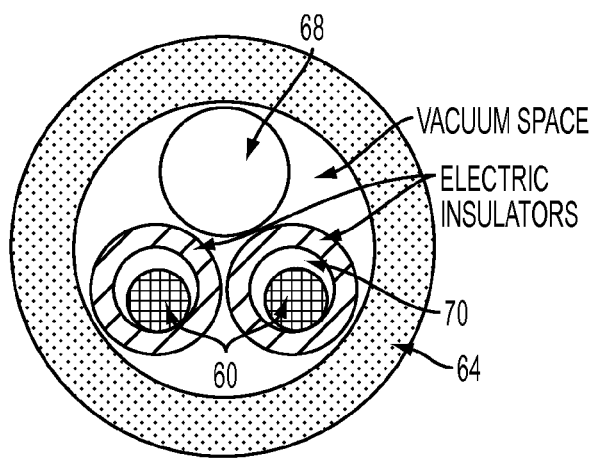
FIG. 24 is a cross-sectional view of another embodiment of the invention including a coolant return channel within the cryostat.

With reference now to FIG. 23, a normal conductor 66 is disposed within the cryostat 64 along with the superconducting conductors 60 within their insulators 62. As shown in FIG. 24, instead of a normal conductor 66, there may be provided a coolant return channel 68. In this configuration, coolant is fed through both cable coolant channels 70 and returned through the coolant return channel 68. In the circular cross section of the cryostat configuration shown in FIGS. 23 and 24, the cables can be twisted together with the normal conductor or the coolant return channel.

The designs shown in FIGS. 21-24 are advantageous in that they permit the superconducting cable to be installed separately from the electrical insulator. The design also reduces friction among the surfaces of the cable insulator and cryostat resulting in a simpler design. Further, coolant flows directly on the superconducting cable surface thereby providing efficient cable cooling. The coolant feed system design for a cable cryostat is very flexible. Electric field distribution in the insulator can be improved by covering the insulator surface with an electrically conductive tube. The design in these figures allows easier cable installations and terminations (joints) than in conventional cabling methods.

It would be advantageous to have good thermal contact between the return path of the coolant and the inner wall of the cryostat. In this manner, the heat intercepted by the cryostat is removed by coolant that is not in direct contact with the superconductor, and thus can have much higher temperature excursions without affecting the current-carrying capability of the superconductor, simplifying the design of the cryogenic system, especially for long lengths.

Figure 25A:
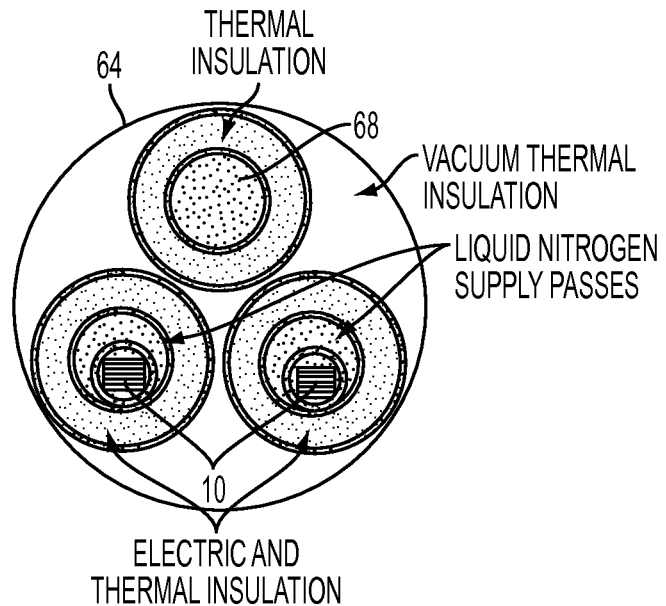
FIG. 25(a) is a cross-sectional view of an embodiment of the invention including two cables shown in FIG. 2 and a cooling return channel within the cryostat.
Figure 25B:
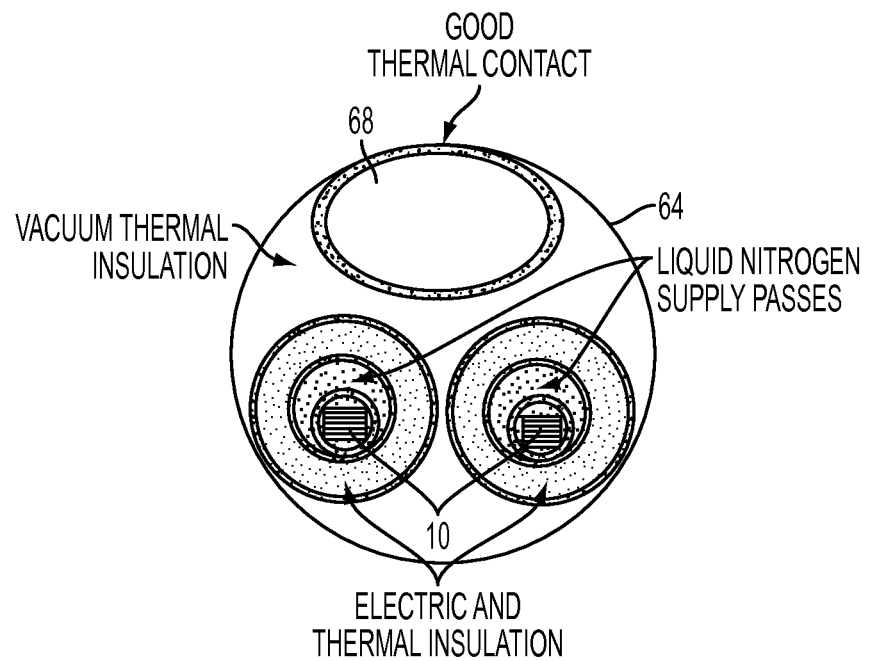
FIG. 25(b) is a cross-sectional view of an embodiment of the invention including two cables shown in FIG. 2 and a cooling return channel in good thermal contact with the inner wall of the cryostat.

Two additional embodiments are shown in FIGS. 25(a) and 25(b). In FIG. 25(a), two cables 10 as discussed in conjunction with FIG. 2 are included along with a cooling return channel 68. As mentioned earlier with regard to FIGS. 23 and 24, the circular configuration of FIG. 25(a) allows twisting of the cables. FIG. 25(b) is an embodiment of the invention including two cables 10 as discussed above in conjunction with FIG. 2 and a cooling return channel 68 in good thermal contact with the inner wall of the cryostat 64.

The contents of all of the references set forth herein are incorporated herein by reference in their entirety.

It is recognized that modifications and variations of the invention will be apparent to those of skill in the art and it is intended that all such modifications and variations be included within the scope of the appended claims.

What is claimed is:

1. Superconductor cable comprising:
a plurality of flat, tape-shaped ribbon superconductor wires assembled to form a stack having a rectangular cross section, the stack having a symmetrical torsional twist about a longitudinal axis of the stack.

2. The superconductor cable of claim 1 herein the wires are YBCO, BSCCO, or $MgB_2$.

3. The superconductor cable of claim 1 wherein the stack has a substantially square cross section.

4. The superconductor cable of claim 1 wherein the twist is within the range of strain tolerances of the superconductor wires.

5. The superconductor cable of claim 1 wherein the twist is performed before the final wire heat-treatment process.

6. The superconductor cable of claim 1 wherein the superconductor wires in the twisted stack are partially or fully bonded together.

7. The superconductor cable of claim 1 wherein the stack is bonded with electrically conducting material.

8. The superconductor cable of claim 7 wherein the electrically conducting material is solder.

9. The superconductor cable of claim 6 wherein the stack is bonded with non-electrically conducting material.

10. The superconductor cable of claim 1 wherein the stack is enclosed within an electrically conducting sheath.

11. The superconductor cable of claim 10 wherein the sheath is copper.

12. The superconductor cable of claim 10 wherein the sheath is aluminum.

13. The superconductor cable of claim 10 wherein the sheath is selected from the group consisting of steel, stainless steel, titanium, titanium alloy, Inconel an Incoloy.

14. The superconductor cable of claim 10 wherein the sheath is a round outside diameter sheath with a square of along its axis.

15. The superconductor cable comprising a plurality of the cables of claim 1 twisted together.

16. The superconductor cable of claim 15 wherein the number of cables is three.

17. The superconductor cable of claim 15 wherein the number of cables is four.

18. The superconductor cable of claim 15 wherein the number of cables is nine.

19. The superconductor cable of claim 15 wherein the number of cables is twelve.

20. The superconductor cable comprising a plurality of the cables of claim 1 allocated around a longitudinal axis and twisted about the longitudinal axis.

21. The superconducting cable of claim 20 wherein the twisted tapes keep the surface planes oriented perpendicular to the radial direction of the longitudinal cable axis.

22. The superconductor cable of claim 20 wherein the number of cables is three.

23. The superconductor cable of claim 20 wherein the number of cables is four.

24. The superconductor cable of claim 20 wherein the number of cables is five.

25. The superconductor cable of claim 20 wherein the number of cables is six.

26. The superconductor cable of claim 1 wherein at least one of the superconductor wires is spliced.

27. Superconductor cable comprising:
a plurality of flat, tape-shaped ribbon superconductor wires radiating outwardly from a longitudinal axis and symmetrically twisted about the longitudinal axis.

28. The superconductor cable of claim 27 wherein the plurality of superconductor wires is encased in a sheath.

29. The superconductor cable of claim 28 wherein the sheath is conducting.

30. The superconductor cable of claim 28 wherein the sheath is non-conducting.

31. Superconductor cable comprising:
a tube including a plurality of spiral grooves along its length and on the surface of the tube; and
at least one tape-shaped superconductor disposed in each of the grooves.

32. The cable of claim 31 including a stack of tape-shaped superconductors disposed in each groove.

33. The cable of claim 31 wherein the tube is split along a spiral groove.

34. The cable of claim 31 wherein the tube includes eight grooves.

35. The cable of claim 31 wherein the tube includes twelve grooves.

36. The cable of claim 31 wherein the tube includes five grooves.

37. The cable of claim 31 wherein the tube includes four grooves.

38. The cable of claim 32 wherein the tapes in the stack are insulated.

39. The cable of claim 32 wherein the tape in the stack are soldered to the tube, the tube being made of an electrically conductive material.

40. The cable of claim 31 further including a twisted stack of superconductors disposed within the tube.

41. The cable of claim 40 wherein the tube is split.

42. The cable of claim 40 further including a sheath surrounding the twisted stack within the tube.

43. The cable of claim 40 further including insulation surrounding the tube.

44. The cable of claim 42 further including insulation disposed between the sheath and the tube.

45. The cable of claim 42 further including spacers disposed between the sheath and the tube to provide a coolant channel.

46. The cable of claim 31 further including a second tube disposed within, and spaced from, the tube, the second tube including a plurality of spiral grooves having tape-shaped superconductors disposed therein.

47. Superconductor cable structure comprising:
a superconducting cable disposed within, and spaced apart from, an insulator creating a coolant channel therebetween; and
a cryostat surrounding, and spaced apart from, the insulator to create a return coolant channel or a vacuum space for thermal insulation.

48. The cable structure of claim 47 wherein wall thickness of the insulator is selected based on applied voltage.

49. The cable structure of claim 47 wherein the insulator includes metallic portions.

50. The cable structure of claim 47 wherein the insulator has a smooth surface.

51. The cable structure of claim 47 further including a second superconducting cable disposed within, and spaced apart from, a second insulator, the second superconducting cable/insulator combination disposed within the cryostat.

52. The cable structure of claim 51 wherein the cryostat is tubular with a substantially circular cross section.

53. The cable structure of claim 51 wherein the cryostat is tubular with a substantially elliptical cross section.

54. The cable structure of claim 52 wherein the superconducting cable/insulator combinations are twisted together.

55. The cable structure of claim 51 further including a normal conductor disposed within the cryostat.

56. The cable structure of claim 51 further including a coolant return channel disposed within the cryostat.

57. The coolant return channel of claim 56 further including a good thermal contact to the cryostat inner wall.

* * * * *